United States Patent
Newall et al.

(10) Patent No.: US 8,764,069 B2
(45) Date of Patent: Jul. 1, 2014

(54) STEPPED DOWN GRIP RING FOR USE IN PIPE COUPLINGS AND PIPE COUPLING INCORPORATING SAME

(75) Inventors: Peter Newall, North Plympton (AU); David Chelchowski, North Plympton (AU); Malcolm John Pridham, North Plympton (AU)

(73) Assignee: Philmac Pty Ltd, North Plympton (AU)

( * ) Notice: Subject to any disclaimer, the term of this patent is extended or adjusted under 35 U.S.C. 154(b) by 0 days.

(21) Appl. No.: 13/264,844

(22) PCT Filed: Aug. 30, 2011

(86) PCT No.: PCT/AU2011/001116
§ 371 (c)(1),
(2), (4) Date: Oct. 17, 2011

(87) PCT Pub. No.: WO2012/027785
PCT Pub. Date: Mar. 8, 2012

(65) Prior Publication Data
US 2012/0175874 A1    Jul. 12, 2012

(30) Foreign Application Priority Data
Aug. 31, 2010  (AU) .............................. 2010903895

(51) Int. Cl.
*F16L 21/06* (2006.01)
(52) U.S. Cl.
USPC .............................. 285/323; 285/12; 285/243
(58) Field of Classification Search
USPC ............ 285/322, 323, 324, 249, 339, 243, 12
See application file for complete search history.

(56) References Cited

U.S. PATENT DOCUMENTS

| | | | | |
|---|---|---|---|---|
| 791,905 | A * | 6/1905 | Higginbotham | 285/249 |
| 1,886,413 | A * | 11/1932 | Metcalf, Jr. | 285/323 |
| 2,460,653 | A * | 2/1949 | Raybould | 285/249 |
| 3,233,924 | A * | 2/1966 | Stanley et al. | 285/322 |
| 3,606,396 | A * | 9/1971 | Prosdocimo et al. | 285/249 |
| 3,724,882 | A * | 4/1973 | Dehar | 285/243 |
| 3,889,989 | A * | 6/1975 | Legris | 285/249 |
| 3,895,832 | A * | 7/1975 | Ellis et al. | 285/322 |
| 3,980,325 | A * | 9/1976 | Robertson | 285/249 |
| 4,188,051 | A * | 2/1980 | Burge | 285/323 |
| 4,431,216 | A * | 2/1984 | Legris | 285/249 |
| 4,627,644 | A * | 12/1986 | Ekman | 285/249 |
| 4,900,068 | A * | 2/1990 | Law | 285/249 |
| 7,270,351 | B2 * | 9/2007 | Chelchowski et al. | 285/249 |
| 7,455,328 | B2 * | 11/2008 | Chelchowski et al. | 285/323 |
| 7,690,695 | B2 * | 4/2010 | Duquette et al. | 285/322 |
| 2010/0156095 | A1 * | 6/2010 | Inoue | 285/249 |

* cited by examiner

*Primary Examiner* — David E Bochna
(74) *Attorney, Agent, or Firm* — Sand & Sebolt

(57) ABSTRACT

A pipe coupling adapted to support a pipe which is freely insertable into the coupling. The coupling includes a hollow body having external threads and a tapered inner surface. A nut having internal threads is co-operable with said body external threads at a first end and with an outwardly converging inner tapered surface at a second end. The coupling includes a deformable gripping member having an internal bore which receives said pipe. The bore includes a first internal surface and a second internal surface, where the second internal surface is of a smaller diameter than the first internal surface. This configuration accommodates pipes of a different diameters. Both of the first and second internal surfaces typically have projections that engage the pipe upon tightening of the nut. The projections for of one of the two different surfaces engage the pipe, depending on its diameter.

14 Claims, 2 Drawing Sheets

STEPPED DOWN GRIP RING FOR USE IN PIPE COUPLINGS AND PIPE COUPLING INCORPORATING SAME

FIELD OF THE INVENTION

The present invention relates to a coupling or transition fitting for the connection of pipes of the type having a gripping member. In particular it relates to an improvement in the gripping member to enable the coupling or transition fitting to be used on two pipes of different diameter or whose diameter falls within a predetermined range.

BACKGROUND OF THE INVENTION

Couplings and transition fittings of the type having a gripping member are well known, see for example Applicant's U.S. Pat. No. 5,593,186. In general these couplings include a nut, body, gripping member having a plurality of inwardly directed barbed projections, as well as a sub-assembly of a compression sleeve and resilient gasket ring that is typically permanently attached to the inner end of the compression sleeve. The nut and the gripping member include abutting tapered surfaces. A pipe end is freely insertable through the sub-assembly and into a socket in the body of the coupling. As the nut is tightened it exerts both a radial and longitudinal force on the grip ring that in turn longitudinally exerts a force on the sleeve and gasket ring. The gasket ring encounters an abutment in a socket in the body, and further tightening of the nut then further radially compresses the gripping member so that its inwardly directed barbed projections engage the outer surface of a pipe to which the coupling is attached. There may also be provided abutment surfaces within the body of the coupling and the nut that abut inner and outer surfaces of a flange outstanding from the outer end of the compression sleeve.

One skilled in the art will appreciate that as the nut is tightened, the tapered surface of the nut acts upon the tapered surface of the gripping member causing it to be both compressed and urged into the body. As the gripping member engages the pipe it is also drawn into the assembly.

Whilst this works well, couplings are generally designed for a pipe of a particular diameter requiring either the retailer or the end user to stock various couplings. A further problem is that couplings may be manufactured either to meet the metric or the imperial standard.

The main object of this invention is therefore to overcome the abovementioned problems or at least provide the public with a useful alternative by providing improvements whereby the coupling can accommodate pipes of two different diameters. In particular the coupling can accommodate two pipes whose diameter may be different by up to 5-10 mm.

SUMMARY OF THE INVENTION

Therefore in one form of the invention there is proposed a retaining device for a pipe coupling comprising:
 a radially deformable gripping member having an internal bore adapted to receive a pipe therein, the internal bore having a first internal surface of a first diameter and a second internal surface of a second smaller diameter.
In preference the second surface is located centrally within the bore.
In preference each of the first and second surfaces includes projections adapted to engage the pipe.
In preference the projections extend inwardly.

In preference the projections of the first internal surface are adapted to engage a pipe of a first diameter, the projections on the second surface adapted to engage a pipe of a second and smaller diameter.

In a further form of the invention there is proposed a grip ring for use in a pipe coupling including an internal bore of at least two different diameters and including projections adapted to engage different diameter pipes inserted into the bore.

In a still further form of the invention there is proposed a pipe coupling wherein a pipe is freely insertable into the coupling, comprising:
 a hollow body having external threads and a tapered inner surface;
 a nut having internal threads co-operable with said body external threads at a first end and an outwardly converging inner tapered surface at a second end; and
 a deformable gripping member having an internal bore adapted to receive said pipe and including a tapered outer surface, the member having a first internal surface and a second internal surface wherein the second internal surface is of a smaller diameter than the first internal surface both surfaces including projections; and
 wherein upon tightening of said nut, said nut tapered inner surface abuts against and exerts a force on said tapered outer surface of said gripping member in substantially longitudinal and radial directions to thereby cause said gripping member to be urged both radially and longitudinally into said pipe when said pipe is inserted into said coupling, whereby said gripping member substantially restricts longitudinal and rotational movement of said pipe.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DESCRIPTION OF THE PREFERRED EMBODIMENT

Figure 1:
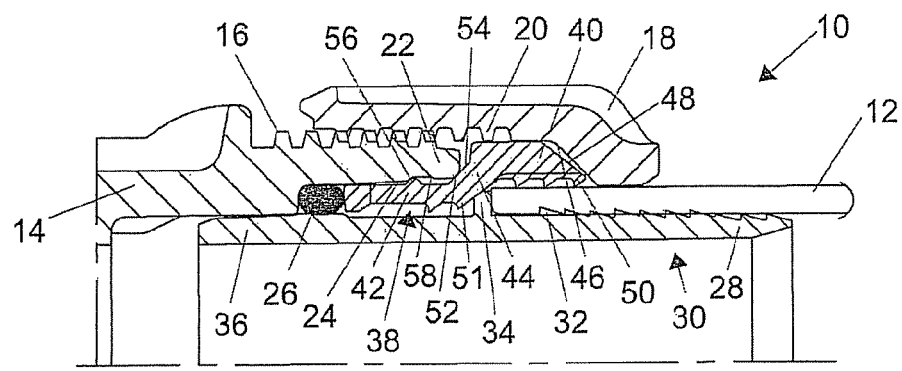
FIG. 1 is a partial cross-sectional view illustrating a pipe end inserted onto a spigot and inserted through a sub-assembly comprising a nut, gripping member embodying the present invention, assembly and gasket and into a socket in the body of a fitting.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

It is to be understood that reference to the following fitting is meant by way of example only and the design embodying the present invention may equally well be used on other pipe couplings and/or transition fittings of the type having a split or grip ring.

LIST OF COMPONENTS 10 coupling
12 pipe of a first diameter
14 longitudinal body
16 male threads
18 nut
20 internal threads
22 shoulder
24 diverging inner surface
26 gasket ring
28 first end of spigot
30 spigot
32 spigot barbs
34 flange
36 other end of spigot
38 grip ring
40 front section
42 rear section
44 web
46 tapered nut surface
48 tapered grip ring surface
50 grip ring barbs on front
51 grip ring barbs on rear
52 shoulder tapered surface
54 back of web
56 projection
58 undercut in shoulder
60 pipe (of a smaller diameter)

Figure 2:
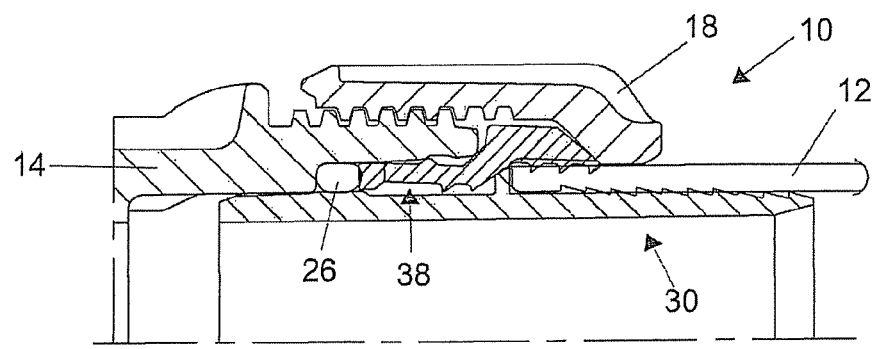
FIG. 2 is the view as in FIG. 1 when the nut has been tightened causing the gripping member to engage the pipe.
Figure 3:
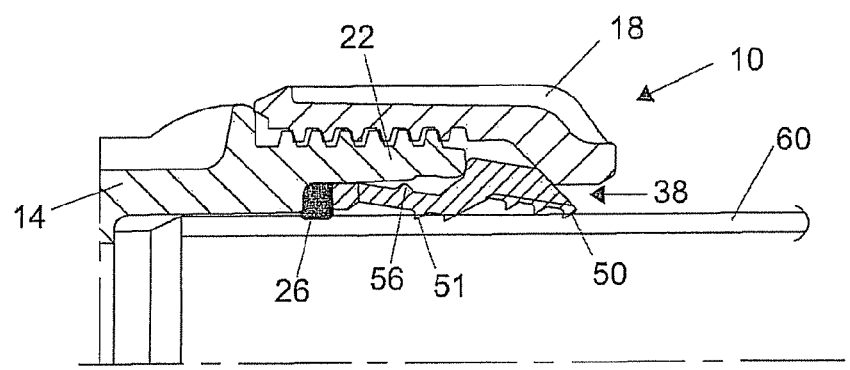
FIG. 3 is a partial cross-sectional view illustrating a pipe end of a smaller diameter than in FIG. 1 inserted through a sub-assembly comprising a nut, gripping member embodying the present invention, assembly and gasket and into a socket in the body of a fitting when in the tightened position causing the gripping member to engage the pipe.
Figure 4:
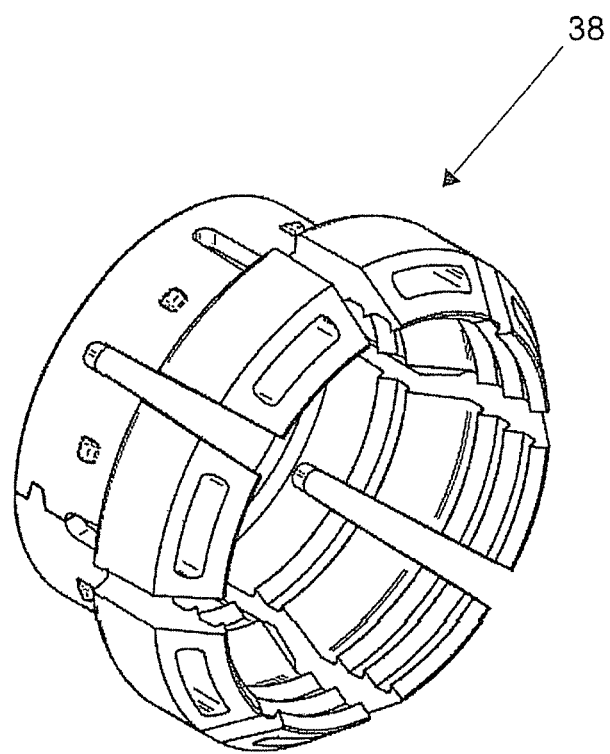
FIG. 4 is a perspective view of the gripping member embodying the present invention.

Shown in FIGS. 1 to 3 is a coupling 10 for outer surface engagement of a pipe 12 having a first diameter. The coupling includes a longitudinal body 14 having male threads 16 at least at one end, the threads adapted for use by nut 18 having internal threads 20 that engage the male threads 16. FIGS. 1 and 3 however only illustrate one nut 18 engaging threads 16. It is therefore to be understood that the present invention may equally well be used on a pipe coupling having symmetrical ends as well as pipe couplings where one of the ends is adapted for connection to a different type of pipe and may accommodate a different fitting.

The body 14 includes a shoulder 22 defining generally an annular outwardly diverging inner surface 24 constituting an abutment surface for a resilient gasket ring 26. The surface 24 does not however need to be diverging.

Pipe 12 is mounted on one end 28 of spigot 30 having barbs 32 and abutting flange 34. The other end 36 of spigot 30 is inserted into body 14. The barbs 32 ensure that the pipe 12 is firmly attached to the spigot 30. Surrounding the pipe 12 is an annular compression sleeve or grip ring 38 having a front section 40 and a rear section 42 connected via web 44, the internal diameter of the front section 40 being greater than the internal diameter of the rear section 42.

The nut 18 includes a tapered surface 46 adapted to engage a tapered surface 48 on the grip ring so that as the nut is screwed onto the body it causes the grip ring to be forced radially inward. The grip ring includes inner barbs 50 on the front section 40 and inner barbs 51 on the rear section 42. The reader should now appreciate that as the nut 18 is screwed on to the body 14 it causes the surface 46 to engage surface 48 and pushes the grip ring radially inwardly, the barbs 50 on the front section 40 biting into the pipe 12 and dragging it and the spigot further into the body 14. The radial movement of the grip ring is also assisted with the body shoulder having a tapered surface 52 that engages the slanted back 54 of the web 44 assisting in compressing downwardly the grip ring 38 until the fitting essentially seals against the pipe as illustrated in FIG. 2. This then provides a radial force to compress the grip ring. Thus as the grip ring moves into the body the projection causes a radial force to be applied to the grip ring, best seen in FIG. 3.

In the case where the pipe 12 is of a smaller diameter, as illustrated in FIG. 3, the pipe 60 is inserted directly into the body and is not mounted on a spigot. As the grip ring is radially deformed it bends downwardly so that only some of the barbs 50 on the front section engage the pipe. This would not provide a sufficient hold on the pipe against fluid pressure. This is where the rear section of the grip ring is caused to play a part in that its barbs 51, being closer radially to the pipe than the barbs at the front section also engage the pipe thereby providing the restraining force to keep the pipe within the coupling or the fitting.

In the absence of barbs 51 on the rear end of the grip ring, only some of the barbs 50 on the front section of the grip ring would engage pipe 60 (that is of a smaller diameter) that extends past the grip ring and into the body. Thus the pipe would not be held as securely as one would like and thus the present invention provides a grip ring to overcome that problem by providing additional barbs that engage the pipe.

The prevent the grip ring from falling out of the body when there is not nut present the grip ring is provided with a projection 56 that when assembled in the coupling is held in undercut 58 in the shoulder. It is however to be understood that this is not an essential feature of the invention.

Whilst the above description illustrated a pipe mounted on a spigot and then a pipe of a smaller diameter there is no reason why the present invention can not be used simply on two pipes of a different diameter without a spigot at all. Thus a pipe coupling may have a grip ring the subject of the invention that is adapted to accommodate pipes whose diameter is within a certain range.

The reader should also appreciate that there may indeed be a bore that has more than two inner surfaces of a different diameter. In fact it may be possible that the grip ring not have a stepped down surface but indeed be tapered from a first diameter to a second smaller diameter to thus accommodate a range of different diameter pipes.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. It is also to be understood that reference to any prior art is not to be taken as an admission that that prior art is part of the common general knowledge.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A retaining device for a pipe coupling comprising:
 a radially deformable gripping member having an internal bore adapted to receive therein one of a first pipe or a second pipe, where the second pipe is of a smaller diameter than the first pipe; wherein the internal bore has a first internal surface of a first diameter and a second internal surface of a second smaller diameter; and the first and second internal surfaces extend in the same longitudinal direction; and wherein each of the first and second internal surfaces includes projections and the projections of the first internal surface are adapted to engage the first pipe when the first pipe is received through a first opening into the internal bore, and the projections on the second internal surface are adapted to engage the second pipe when the second pipe is received through the first opening into the internal bore.

2. The retaining device for a pipe coupling as in claim 1, wherein the second internal surface is located centrally within the bore.

3. The retaining device for a pipe coupling as in claim 1, wherein the projections extend inwardly into the bore.

4. The retaining device for a pipe coupling as in claim 1, wherein some or all of the projections on both of the first and second internal surfaces of the gripping member are adapted to engage the smaller diameter second pipe when the gripping member is compressed radially inwardly.

5. The retaining device for a pipe coupling as in claim 1, further comprising at least one additional projection extending outwardly from an exterior surface of the gripping member.

6. The retaining device for a pipe coupling as in claim 5, wherein the gripping member includes a first section of a first external diameter and a second section of a second smaller external diameter; said first and second sections being joined together by a web; and wherein the first opening is defined in the first section; and the at least one additional projection extends outwardly from the second section.

7. The retaining device for a pipe coupling as in claim 6, wherein an end of the first section defining the first opening is tapered so that it is thinner than a wall of the gripping member which comprises the first section.

8. The retaining device for a pipe coupling as in claim 7, further comprising a nut configured to engage only the first section of the gripping member and to compress the first section radially inwardly.

9. The retaining device for a pipe coupling as in claim 8, further comprising a body interposed between the nut and the second section of the gripping member; said body being configured to compress the second section of the gripping member radially inwardly when the nut is tightened.

10. The retaining device for a pipe coupling as in claim 9, wherein the nut and the body are threadably engaged with each other.

11. A pipe coupling wherein a pipe is freely insertable into the coupling, comprising:
    a hollow body having external threads and a tapered inner surface;
    a nut having internal threads co-operable with said body external threads at a first end and an outwardly converging inner tapered surface at a second end;
    a deformable gripping member having an internal bore adapted to receive said pipe and including a tapered outer surface, the gripping member having a first internal surface and a second internal surface, wherein the second internal surface is of a smaller diameter than the first internal surface, and wherein both of the first and second internal surfaces include projections adapted to engage the pipe; and wherein the projections of the first internal surface are adapted to engage a first pipe of a first diameter, and the projections on the second internal surface are adapted to engage a second pipe of a second and smaller diameter; and wherein upon tightening of said nut, said nut tapered inner surface abuts against and exerts a force on said tapered outer surface of said gripping member in substantially longitudinal and radial directions to thereby cause said gripping member to be urged both radially and longitudinally into said pipe when said pipe is inserted into said coupling, whereby said gripping member substantially restricts longitudinal and rotational movement of said pipe.

12. The pipe coupling as in claim 11, wherein the second internal surface is located centrally within the bore.

13. The pipe coupling as in claim 11, wherein the projections extend inwardly into the bore.

14. The pipe coupling as in claim 11, wherein the first diameter is from about 5 mm to about 10 mm larger than the second diameter.

* * * * *